(12) United States Patent
Noguchi

(10) Patent No.: US 9,733,415 B2
(45) Date of Patent: Aug. 15, 2017

(54) DISPLAY PANEL UNIT AND DISPLAY DEVICE

(71) Applicant: Japan Display Inc., Tokyo (JP)

(72) Inventor: Michikazu Noguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/509,425

(22) Filed: Oct. 8, 2014

(65) Prior Publication Data

US 2015/0109755 A1 Apr. 23, 2015

(30) Foreign Application Priority Data

Oct. 18, 2013 (JP) .................................. 2013-217478

(51) Int. Cl.
| | |
|---|---|
| *F21V 8/00* | (2006.01) |
| *G02B 27/28* | (2006.01) |
| *G02B 5/30* | (2006.01) |
| *G02F 1/1335* | (2006.01) |

(52) U.S. Cl.
CPC ......... *G02B 6/0056* (2013.01); *G02B 5/3041* (2013.01); *G02B 27/285* (2013.01); *G02F 1/133536* (2013.01)

(58) Field of Classification Search
CPC ... G02B 6/0056; G02B 5/3041; G02B 27/285
See application file for complete search history.

(56) References Cited

U.S. PATENT DOCUMENTS

| | | |
|---|---|---|
| 2002/0012169 A1 | 1/2002 | Kashima |
| 2006/0104088 A1 | 5/2006 | Gon et al. |
| 2011/0013120 A1 | 1/2011 | Sun et al. |
| 2011/0273643 A1* | 11/2011 | Arai .................. G02F 1/133528 349/64 |

FOREIGN PATENT DOCUMENTS

| | | |
|---|---|---|
| JP | 10-232313 A | 9/1998 |
| JP | 2003-177394 | 6/2003 |
| JP | 2004-240087 A | 8/2004 |

(Continued)

OTHER PUBLICATIONS

Korean Office Action issued Oct. 19, 2015 for corresponding Korean Application No. 10-2014-0138169.

(Continued)

*Primary Examiner* — Bumsuk Won
*Assistant Examiner* — Jacob R Stern
(74) *Attorney, Agent, or Firm* — Michael Best & Friedrich LLP

(57) ABSTRACT

In an embodiment, a display panel unit includes a reflective polarizing layer, a transparent layer, and a display panel. The polarizing layer transmits a first polarized component of light incident on an incident surface to an exit surface and reflects a second polarized component of the light. The transparent layer transmits the first and second polarized component of the light incident on a second surface to a first surface adhered to the incident surface and transmits the second polarized component reflected by the polarizing layer to be incident on the first surface to the second surface. The panel faces the exit surface, and selectively transmits the light exiting from the exit surface.

10 Claims, 6 Drawing Sheets

(56) References Cited

FOREIGN PATENT DOCUMENTS

| | | |
|---|---|---|
| JP | 2006-147566 | 6/2006 |
| JP | 2007-042540 A | 2/2007 |
| JP | 2010-231896 | 10/2010 |
| JP | 2010-256771 A | 11/2010 |
| JP | 2010-256771 A | 11/2010 |
| JP | 2012-524303 A | 10/2012 |
| KR | 10-0294815 B1 | 7/2001 |
| KR | 2006-0129843 A | 12/2006 |
| KR | 2006-0129843 A | 12/2008 |
| KR | 2009-0123527 A | 12/2009 |
| KR | 2010-010212 A | 2/2012 |
| KR | 2012-010212 A | 2/2012 |
| TW | 200513678 A | 4/2005 |

OTHER PUBLICATIONS

Taiwanese Office Action issued Nov. 19, 2015 for corresponding Taiwanese Application No. 103135881.
Japanese Office Action issued Feb. 23, 2016 for corresponding Japanese Application No. 2013-217478.
Korean Office Action issued Aug. 17, 2016, for corresponding Japanese Application No. 10-2016-0092612.

\* cited by examiner

| | Thickness H of transparent layer | | N/R | Transparency |
|---|---|---|---|---|
| (1) | None | | NG | 100 |
| (2) | 10 μm | (PET5 μm+Glue 5 μm) | NG | Substantially 100 |
| (3) | 25 μm | (PMMA20 μm+Glue 5 μm) | NG | Substantially 100 |
| (4) | 37 μm | (HC7 μm+TAC25 μm+Glue 5 μm) | OK | Substantially 100 |
| (5) | 59 μm | (HC7 μm+TAC40 μm+Glue 12 μm) | OK | Substantially 100 |
F I G. 4
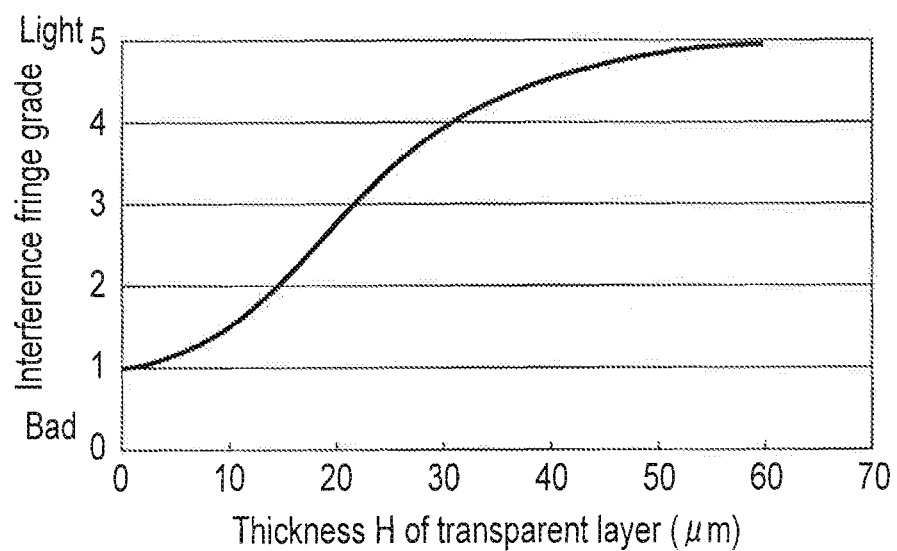
F I G. 5

| | Method for avoiding interference fringe | Effect of interference fringes | Change ratio of brightness |
|---|---|---|---|
| | Comparative methods | | |
| (I) | Diffusion material added to adhesive layer of reflective polarizing plate (Haze glue) | ▲ Interference fringes reduced | -6% or less |
| (II) | Surface of polarizing plate subjected to diffusion treatment (for example, antiglare treatment) | ▲ Interference fringes reduced | -5% or less |
| (III) | Surface of reflective polarizing plate subjected to diffusion treatment (for example, antiglare treatment) | ○ Interference fringes completely avoidable | -5% or less |
| (IV) | Diffusion sheet provided between reflective polarizing plate and prism sheet | ○ Interference fringes completely avoidable | -10% or less |
| | | | |
| | Method of embodiment | | |
| | Transparent layer provided on surface of reflective polarizing plate | ○ Interference fringes completely avoidable | No change in brightness |

FIG. 6

DISPLAY PANEL UNIT AND DISPLAY DEVICE

CROSS-REFERENCE TO RELATED APPLICATIONS

This application is based upon and claims the benefit of priority from Japanese Patent Application No. 2013-217478, filed Oct. 18, 2013, the entire contents of which are incorporated herein by reference.

FIELD

Embodiments described herein relate generally to a display panel unit and a display device.

BACKGROUND

A display device having a prism sheet concentrating a spreading angle of light from a light source upon a certain range and a reflective polarizer facing the prism sheet is used conventionally. When the light passes through the prism sheet, the reflective polarizer transmits, for example, the p-polarized component of the light to a display panel (such as a liquid crystal panel) side and reflects the s-polarized component of the light onto a light source side.

The s-polarized component reflected by the reflective polarizer is again reflected by, for example, an optical element such as a reflective plate provided on the light source side, and reaches back the reflective polarizer. Such a reflection process is repeated, and the s-polarized component converts into the p-polarized component by-and-by and passes through the reflective polarizer. When the reflective polarizer is used, the utilization efficiency of the light from the light source increases and thus, the brightness of the display device increases.

In a display device with such a structure, interference fringes may occur between the prism sheet and the reflective polarizer. The interference fringe is one of the causes of display quality deterioration in the display device. Therefore, reduction or prevention of the occurrence of interference fringes is demanded.

BRIEF DESCRIPTION OF THE DRAWINGS

FIG. 4 is a table explaining structures of the liquid crystal display device of the embodiment and their evaluation results.

FIG. 5 is a graph showing grades of interference fringes occurring in the liquid crystal display device of the embodiment.

FIG. 6 is a table indicating some comparative examples used to avoid interference fringes by methods different from the embodiment.

DETAILED DESCRIPTION

Figure 1:
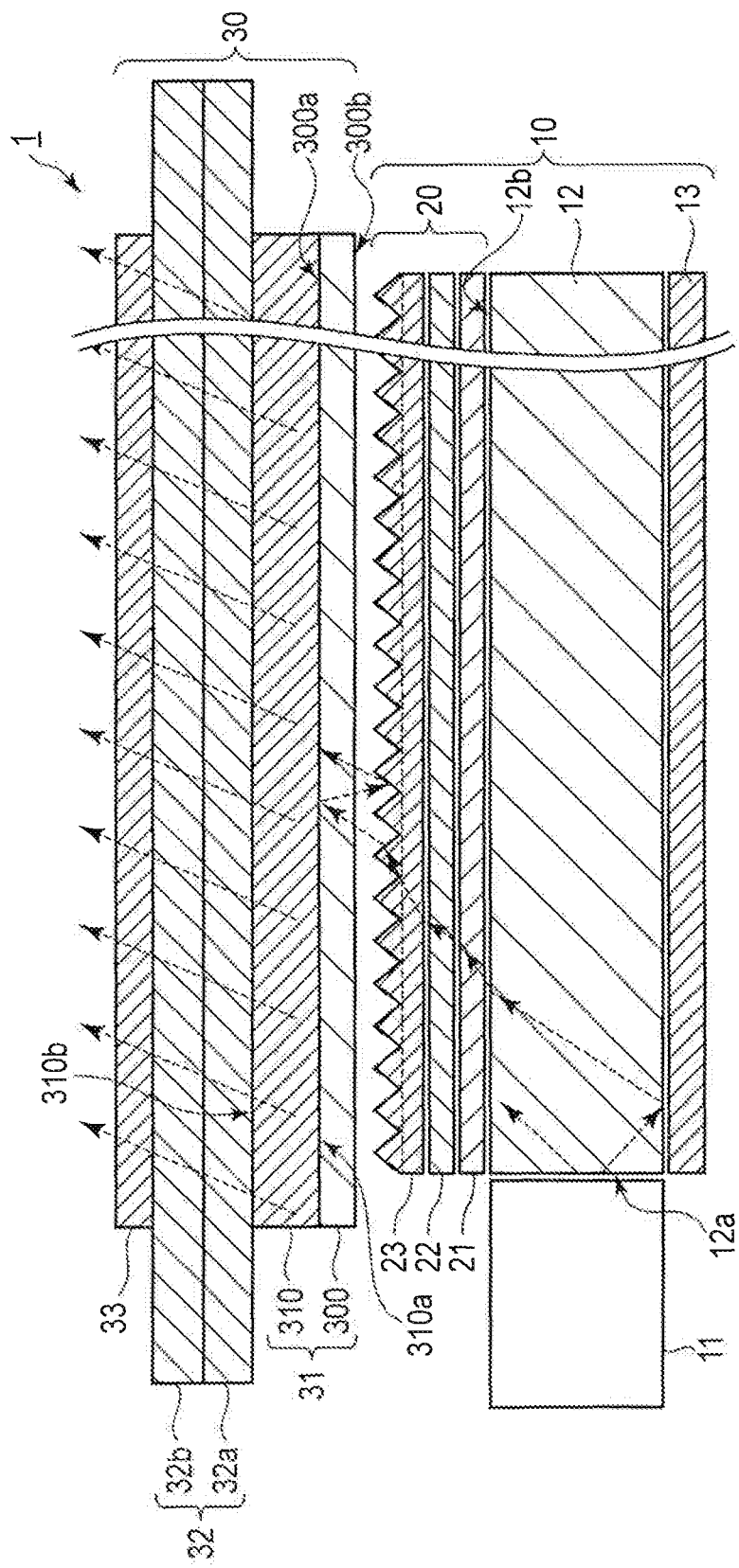
FIG. 1 is a cross-sectional view schematically showing the structure of a liquid crystal display device of an embodiment.

In general, according to one embodiment, a display panel unit includes a reflective polarizing layer, a transparent layer, and a display panel. The reflective polarizing layer includes an incident surface of light and an exit surface opposed to the incident surface, and the reflective polarizing layer transmits a first polarized component of the light incident on the incident surface to the exit surface and reflects a second polarized component of the light incident on the incident surface which is orthogonal to the first polarized component. The transparent layer includes a first surface adhered to the incident surface of the reflective polarizing layer and a second surface opposed to the first surface, and the transparent layer transmits the first polarized component and the second polarized component of the light incident on the second surface to the first surface and transmits the second polarized component reflected by the reflective polarizing layer to be incident on the first surface to the second surface. The display panel faces the exit surface of the reflective polarizing layer and selectively transmits the light exiting from the exit surface.

According to another embodiment, a display device includes a light source, a light guide, a reflective polarizing layer, a transparent layer, a prism sheet, and a display panel. The light guide includes a first incident surface on which light from the light source is incident and a first exit surface from which the light incident on the first incident surface exits. The reflective polarizing layer includes a second incident surface on which the light from the first exit surface is incident and a second exit surface opposed to the second incident surface, and the reflective polarizing layer transmits a first polarized component of the light incident on the second incident surface to the second exit surface and reflects a second polarized component of the light incident on the second incident surface which is orthogonal to the first polarized component. The transparent layer includes a first surface adhered to the second incident surface of the reflective polarizing layer and a second surface opposed to the first surface, and the transparent layer transmits the first polarized component and the second polarized component of the light incident on the second surface to the first surface and transmits the second polarized component reflected by the reflective polarizing layer to be incident on the first surface to the second surface. The prism sheet is interposed between the light guide and the transparent layer, and the prism sheet includes a prism surface on which prism lenses are formed and which faces the second surface. The display panel faces the second exit surface of the reflective polarizing layer, and the display panel selectively transmits the light exiting from the second exit surface.

One of the embodiments will be explained with reference to the accompanying drawings.

The present embodiment utilizes a transmissive type liquid crystal display device as an example of a display device.

Initially, explained are the structure of a liquid crystal display device used generally and interference fringes occurring in the liquid crystal display device.

Figure 7:
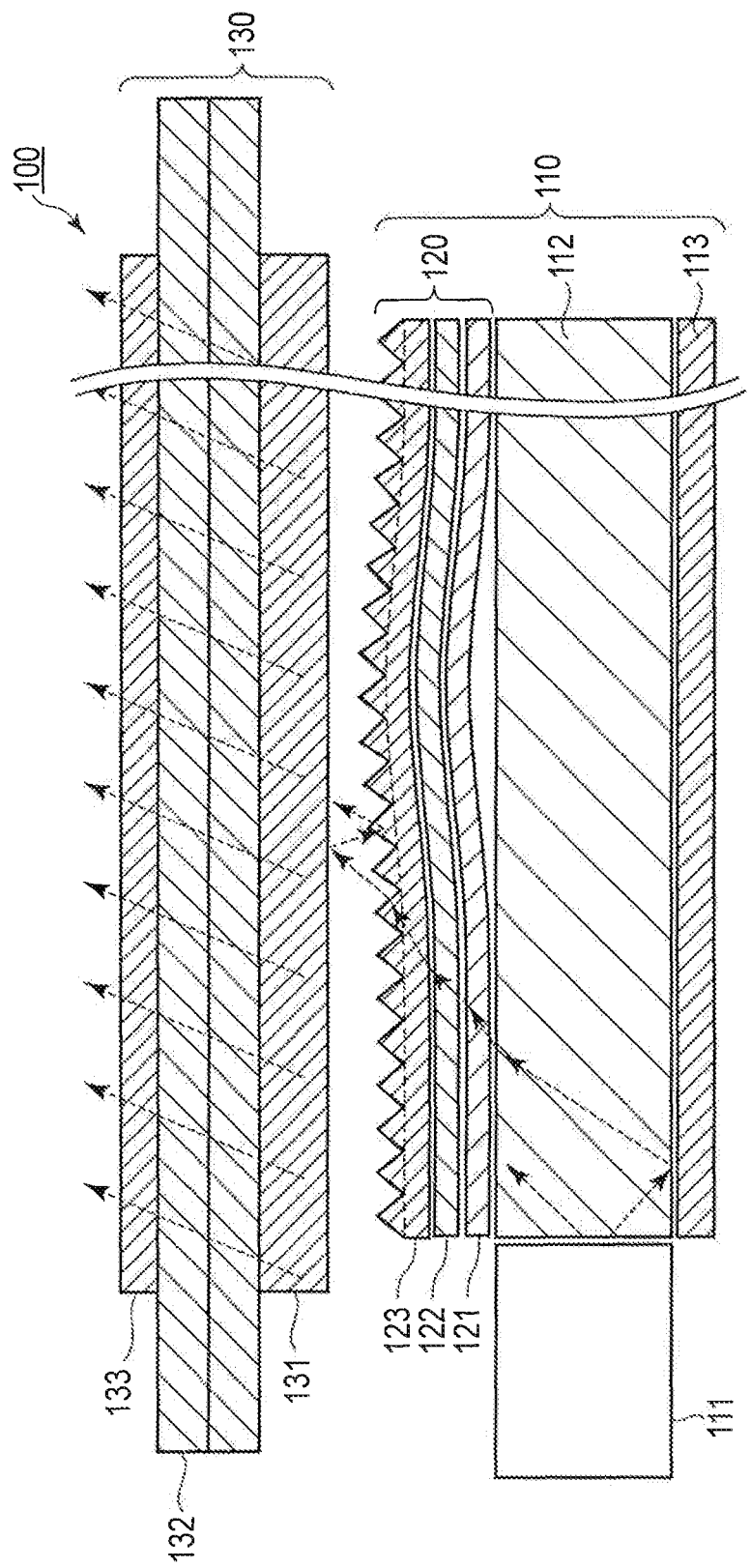
FIG. 7 is a cross-sectional view schematically showing the structure of a conventionally-used liquid crystal display device.

FIG. 7 is a cross-sectional view showing the schematic structure of a generally-used liquid crystal display device 100. The liquid crystal display device 100 includes a backlight unit 110 and a display panel unit 130. The dotted arrows in FIG. 7 show how a part of the light goes within the liquid crystal display device 100.

The backlight unit 110 includes a light source 111 which may be a linear light source or may be composed of a plurality of spot light sources arranged on a single line, optical elements 120, light guide 112 which gathers the light from the light source 111 and emits the uniform light toward the optical elements 120, and a reflective sheet 113 which reflects the light going out of the lower part of the light guide 112 in FIG. 7 to turn the light back in the light guide 112.

The optical elements 120 include a diffusion sheet 121 which diffuses the light from the light guide 112 and a first prism sheet 122 and a second prism sheet 123 both of which concentrate the spreading angle of the light diffused by the diffusion sheet 121 to a certain angle range. The first prism sheet 122 and the second prism sheet 123 have the surfaces to face the display panel unit 130. These surfaces are formed as prism surfaces on which a number of prism lenses each having a uniform cross-sectional shape are extending in parallel. Note that the cross sectional shape of the prism lens may not be uniform.

The display panel unit 130 includes a reflective polarizing plate 131 which transmits the p-polarized component of the light going out of the optical elements 120 and reflects the s-polarized component of the light orthogonal to the p-polarized component, a liquid crystal panel 132 which selectively transmits the light going out of the reflective polarizing plate 131, and a polarizing plate 133 which transmits a specific polarized component of the light which has passed through the liquid crystal panel 132. An air layer is formed between the second prism sheet 123 and the reflective polarizing plate 131.

The s-polarized component reflected by the reflective polarizing plate 131 is reflected by, for example, the prism surface of the second prism sheet 123 and the reflective sheet 113 and reaches the reflective polarizing plate 131 again. Through such repeated reflection processes, the s-polarized component by-and-by converts into the p-polarized component and passes through the reflective polarizing plate 131.

In FIG. 7, the optical elements 120 are partly warped. Such a warp is caused by, for example, an external force applied to the liquid crystal display device 100. The warp in the optical elements 120, especially, the warp of the second prism sheet 123 causes interference fringes on the display surface of the liquid crystal display device 100.

Figure 8:
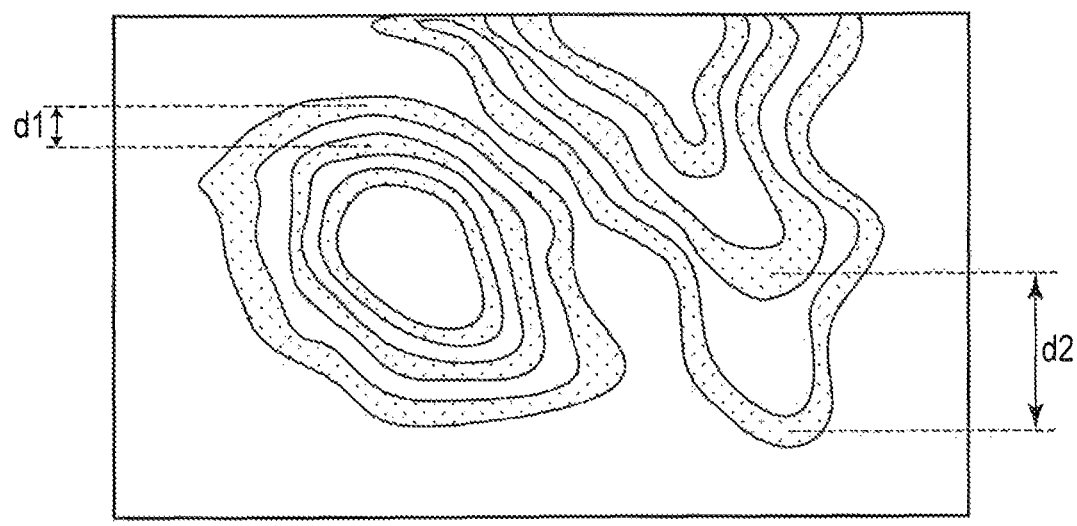
FIG. 8 is a view schematically showing an example of interference fringes appearing on a display surface of a liquid crystal display device.

FIG. 8 schematically shows interference fringes appearing on a display surface. Each of symbols d1 and d2 (d1<d2) in FIG. 8 indicates a pitch in a part of the interference fringes. In a part where the warp of the second prism sheet 123 is large, the pitch of the interference fringes becomes narrow as d1, and in a part where the warp of the second prism sheet 123 is small, the pitch of the interference fringes becomes wide as d2.

It is considered that the interference fringes are caused due to the interference between the light irradiated from the light source 111 to reach the second prism sheet 123 and the light reflected by the reflective polarizing plate 131 and again reflected by the reflective sheet 113 or the like to reach the second prism sheet 123, or the interference between the light and shade seen along the prism lens of the second prism sheet 123 and the reflective image generated by the reflective polarizing plate 131, or the like. A gap between the second prism sheet 123 and the reflective polarizing plate 131 may become narrow locally when the gap becomes nonuniform. And this local narrowness causes the above interferences.

Now, a liquid crystal display device of the present embodiment will be explained.

FIG. 1 is a cross-sectional view schematically showing the structure of liquid crystal display device 1 of the present embodiment. The liquid crystal display device 1 includes a backlight unit 10 and a display panel unit 30. The dotted arrows in FIG. 1 show how a part of the light goes in the liquid crystal display device 1.

The backlight unit 10 includes a light source 11, a light guide 12, a reflective sheet 13, and optical elements 20. The light source 11 is, for example, disposed at one end of the light guide 12 as a plurality of spot light sources arranged linearly. The spot light sources are, for example, light emitting diodes (LEDs) or organic electroluminescent devices. The light source may be a linear light source formed of a cold cathode fluorescent tube or a hot cathode fluorescent tube instead.

The light guide 12 includes an incident surface 12*a* which faces the light source 11 and on which the light from the light source 11 is incident and an exit surface 12*b* which faces the display panel unit 30 and from which the light incident upon the incident surface 12*a* exits. That is, the light guide 12 functions as, for example, a plane light source having a rectangular exit surface. The reflective sheet 13 is provided on the lower surface of the light guide 12 in FIG. 1 (that is, provided on the surface of the light guide 12 opposite to the exit surface 12*b* side), and reflects the light going out of the lower surface of the light guide 12 to turn back to the light guide 12.

The optical elements 20 include a diffusion sheet 21, a first prism sheet 22, and a second prism sheet 23 arranged in this order from the light guide 12 side. The diffusion sheet 21, first prism sheet 22, and second prism sheet 23 are all shaped substantially the same as the exit surface 12*b* of the light guide 12 when viewed in a plane view and disposed on the exit surface 12*b* in this order.

The diffusion sheet 21 diffuses the light from the exit surface 12*b* of the light guide 12 and uniforms the brightness of the light incident upon the first prism sheet 22. The diffusion sheet 21 may include, for example, a light-diffusing structure on its surface which diffuses the light, or may include microparticles or the like to have a refractive index different from that of the main structural material. Each of the first prism sheet 22 and the second prism sheet 23 has a prism surface on which a plurality of prism lenses each having a uniform cross-sectional shape are extending in parallel. The cross sectional shape of the prism lens is, for example, a triangle whose vertex angle is substantially 90 degrees. The first prism sheet 22 and the second prism sheet 23 are layered such that the ridgelines of the prism lenses are orthogonal to each other, for example. Note that the cross sectional shape of the prism lens of the first prism sheet 22 and the second prism sheet 23 may not be uniform.

Using the work of prism lens, the first prism sheet 22 and the second prism sheet 23 concentrate the spreading angle of the light diffused by the diffusion sheet 21 upon a certain angle range. The ends of the light source 11, the light guide 12, the reflective sheet 13, the diffusion sheet 21, the first prism sheet 22, and the second prism sheet 23 are held by, for example, a frame-shaped bezel.

The display panel unit 30 faces the exit surface 12*b* of the light guide 12. Furthermore, the ends of the display panel unit 30 are supported by a frame or a bezel. The display panel unit 30 includes a reflective polarizing plate 31 as a reflective polarizer, a liquid crystal panel 32 as a display panel, and a polarizing plate 33.

The liquid crystal panel 32 includes, for example, an array substrate 32*a* with a large number of pixel electrodes, a counter substrate 32*b* facing the array substrate 32*a* interposing a microgap therebetween, and a liquid crystal layer composed of liquid crystal components sealed between the array substrate 32*a* and the counter substrate 32*b*. The counter substrate 32b includes color filters corresponding to each of the colors red, green, and blue, or the like.

The reflective polarizing plate 31 is adhered to the rear surface of the liquid crystal panel 32, that is, one of the surfaces of the array substrate 32a which faces the backlight unit 10. The polarizing plate 33 is adhered to the display surface of the liquid crystal panel 32, that is, one of the surfaces of the counter substrate 32b which is opposite to the surface facing the array substrate 32a. The reflective polarizing plate 31 and the polarizing plate 33 face the display area of the liquid crystal panel 32.

The liquid crystal panel 32 selectively applies voltage to each of the pixel electrodes to switch liquid crystal molecules in the liquid crystal layer for controlling the transmission (transmissive/nontransmissive) of the light exiting the reflective polarizing plate 31 on a pixel-by-pixel manner in the display area. The unnecessary polarized light component passing through the liquid crystal panel 32 is removed by the polarizing plate 33, and a user can recognize display images on the display area.

The reflective polarizing plate 31 includes a transparent layer 300 and a reflective polarizing layer 310 arranged in this order from the backlight unit 10 side. The reflective polarizing layer 310 has an incident surface 310a on which the light from the exit surface 12b of the light guide 12 is incident, and an exit surface 310b opposed to the incident surface 310a. The transparent layer 300 is adhered closely to the incident surface 310a of the reflective polarizing layer 310.

The reflective polarizing layer 310 passes a first polarized component of the light incident on the incident surface 310a through the exit surface 310b and reflects back a second polarized component of the light incident on the incident surface 310a to the backlight unit 10 side. The transparent layer 300 has a first surface 300a adhered closely to the incident surface 310a of the reflective polarizing layer 310 and a second surface 300b opposed to the first surface 300a. The transparent layer 300 passes the first polarized component and the second polarized component of the light coming from the backlight unit 10 and incident on the second surface 300b through the first surface 300a and passes the light coming from the reflective polarizing layer 310 and incident on the first surface 300a (for example, the light having the second polarized component reflected by the reflective polarizing layer 310 and incident on the first surface 300a) through the second surface 300b. In the present embodiment, the first polarized component is given the p-polarized component and the second polarized component is given the s-polarized component which is orthogonal to the p-polarized component. Note that no limitation is intended by the above, that is, the reflective polarizing plate 31 or the liquid crystal display device 1 may be structured given that the first polarized component is the s-polarized component and the second polarized component is the p-polarized component.

Figure 2:
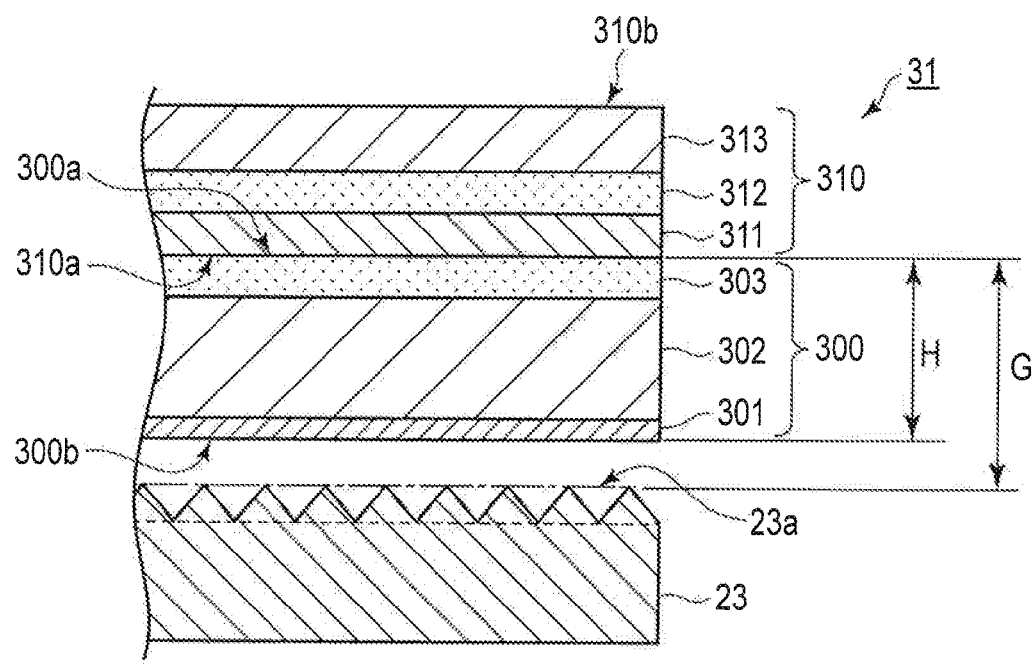
FIG. 2 is a cross-sectional view showing the structure of a reflective polarizing plate of the embodiment.

With reference to the cross-sectional view of FIG. 2, the structure of the reflective polarizing plate 31 is explained in detail. The transparent layer 300 includes a hardcoat (HC) layer 301, a transparent base material 302, and a transparent adhesive layer 303 arranged in this order from the backlight unit 10 side. The reflective polarizing layer 310 includes a reflective layer 311, a transparent adhesive layer 312, and a polarizing layer 313 arranged in this order from the backlight unit 10 side.

In the example of FIG. 2, the incident surface 310a of the reflective polarizing layer 310 corresponds to one of the surfaces of the reflective layer 311 which faces the transparent layer 300, and the exit surface 310b corresponds to one of the surfaces of the polarizing layer 313 which faces the display panel unit 30. Furthermore, the first surface 300a of the transparent layer 300 corresponds to one of the surfaces of the transparent adhesive layer 303 which faces the reflective polarizing layer 310, and the second surface 300b corresponds to one of the surfaces of the HC layer 301 which faces the second prism sheet 23.

Each structural element of the transparent layer 300 is formed of, for example, a material which suppresses an optical loss and an optical phase difference between the elements as low as possible. Specifically, the optical loss of the transparent layer 300 should preferably be lowered to such an extent that the light transparency exceeds 95%. Furthermore, substantially no optical phase difference should preferably be found within the transparent layer 300, that is, substantially no optical phase difference should preferably be found between the light before passing through the transparent layer 300 and the light after passing through the transparent layer 300.

The HC layer 301 protects the surface of the transparent base material 302 in case of, for example, contacting the prism lens of the second prism sheet 23. The HC layer 301 is formed by applying, for example, acrylic resin to the surface of the transparent base material 302. The material of the transparent base material 302 is formed of, for example, polyethylene terephthalate (PET), triacetylcellulose (TAC), cycloolefinpolymer (COP), or polymethyl methacrylate (PMMA) as acrylic resin. The transparent adhesive layer 303 is formed by bonding the transparent base material 302 to the incident surface 310a. The transparent adhesive layer 303 is, for example, an adhesive material of acrylic resin.

The reflective layer 311 passes the p-polarized component of the light incident on the incident surface 310a to the polarizing layer 313 side and reflects the s-polarized component to the second prism sheet 23 side. The transparent adhesive layer 312 is formed by bonding the reflective layer 311 to the polarizing layer 313. The transparent adhesive layer 312 does not substantially block the transmission of any polarized component of the light. The polarizing layer 313 passes the p-polarized component of the light which has passed through the reflective layer 311 and the transparent adhesive layer 312 to the exit surface 310b side and absorbs the other polarizing components. The s-polarized component reflected by the reflective layer 311 again heads for the backlight 10 side and is again reflected by, for example, the prism surface of the second prism sheet 23 or the reflective sheet 13. The s-polarized component then reaches the reflective polarizing plate 31 again. The s-polarized component is reflected repeatedly between the reflective polarizing plate 31 and the backlight 10 and is soon converted into the p-polarized component, and eventually, passes through the reflective polarizing layer 310. As can be understood from the above, when the s-polarized component and the p-polarized component contained in the light from the backlight unit 10 are used effectively, the brightness of the liquid crystal display device 1 can be improved.

Figure 3:
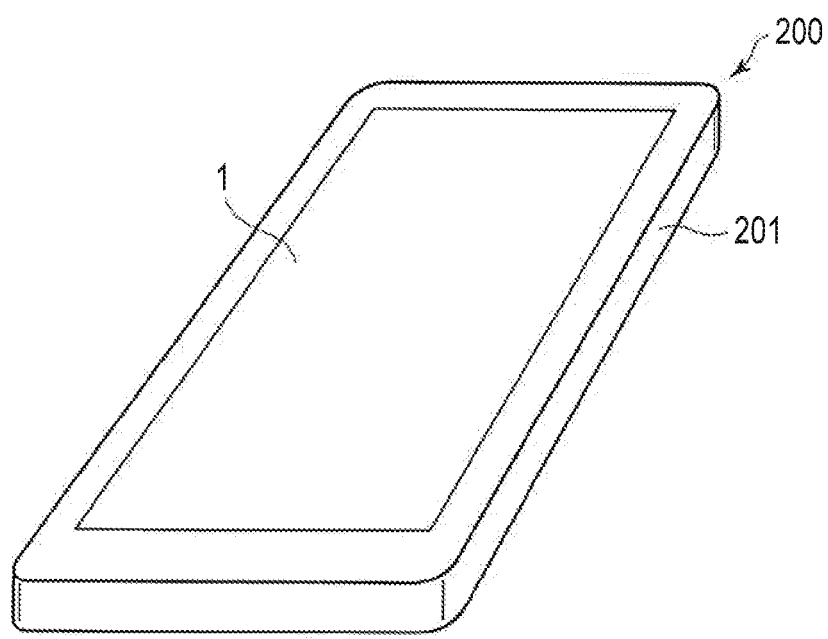
FIG. 3 is a schematic diagram showing an example of how the liquid crystal display device is used.

The backlight unit 10 and the display panel unit 30 are assembled by fixing their ends with, for example, an adhesive material, a bonding material, or a spacer, or by fixing their ends by a bezel. For example, the assembled liquid crystal display device 1 is used in such a state that it is installed in a casing 201 of a smartphone 200 as in FIG. 3. The liquid crystal display device 1 can be used, instead in such a smartphone, as a display of a tablet computer, a mobile phone, a notebook type personal computer, an electronic dictionary, or a various electronic or audio visual devices such as a television device.

Here, as shown in FIG. 2 by a chain double-dashed line, a plane including the ridgelines of the prism lenses formed on the second prism sheet 23 is defined as a prism surface 23a. The prism surface 23a is a surface facing the second surface 300b of the transparent layer 300. Furthermore, the gap between the incident surface 310a of the reflective polarizing layer 310 and the prism surface 23a is defined as G, and the thickness of the transparent layer 300 is defined as H.

Here, since the air layer is formed between the transparent layer 300 and the prism surface 23a, H≤G. Furthermore, the thickness of the air layer, that is, a gap between the prism surface 23a and the second surface 300b of the transparent layer 300 should preferably be less than the thickness of the transparent layer 300.

The gap G may be narrowed locally by warpage caused by an external force applied to the second prism sheet 23 or the reflective polarizing plate 31, or warpage or curving of the second prism sheet 23 or the reflective polarizing plate 31 themselves. If the gap G is locally narrowed beyond a certain extent, interference fringes explained with reference to FIG. 8 will occur. However, the reflective polarizing plate 31 of the present embodiment includes the transparent layer 300 between the reflective polarizing layer 310 and the second prism sheet 23. Therefore, even if the second prism sheet 23 or the like is warped by, for example, an external force, the gap G can be kept greater than the thickness H. Accordingly, the occurrence of interference fringes can be reduced or prevented.

[Examples]

in the following examples, the structure and function of the liquid crystal display device 1 are explained in detail. Note that the scope of the invention is not limited to the following disclosure of these examples.

Liquid crystal display devices 1 with transparent layers 300 having varying thickness H were prepared for visual evaluation of grades of interference fringes. Results were obtained as indicated in the table of FIG. 4. The targets of the visual evaluation were five liquid crystal display devices 1 with the transparent layers 300 having a thickness of (1) none (H=0 μm); (2) H=10 μm; (3) H=25 μm; (4) H=37 μm; and (5) H=59 μm. In each device of (1) to (5), the first prism sheet 22 was prepared as a prism sheet composed of a polyester base material and acrylic resin prism lenses with 24 μm pitches, with a smoothed rear surface of the base material and a total thickness of 65 μm. Furthermore, in each device of (1) to (5), the second prism sheet 23 was prepared as a prism sheet composed of a polyester base material and acrylic resin prism lenses with a pitch of 24 μm, with a rear surface of the base material provided with a mat layer and a total thickness of 70 μm. The gap G was the same in each device of (1) to (5).

In the device of (2), the transparent layer 300 was prepared as a film including a transparent base material 302 formed of PET and having a thickness of 5 μm, and a transparent adhesive layer 303 (glue) formed of acrylic resin and having a thickness of 5 μm. In the device of (2), the transparent layer 300 does not include HC layer 301.

In the device of (3), the transparent layer 300 was prepared as a film including a transparent base material 302 formed of PMMA and having a thickness of 20 μm, and a transparent adhesive layer 303 (glue) formed of acrylic resin and having a thickness of 5 μm. In the device of (3), the transparent layer 300 does not include HC layer 301.

In the device of (4), the transparent layer 300 was prepared as a film including a HC layer 301 formed of acrylic resin and having a thickness of 7 μm, a transparent base material 302 formed of TAC and having a thickness of 25 μm, and a transparent adhesive layer 303 (glue) formed of acrylic resin and having a thickness of 5 μm.

In the device of (5), the transparent layer 300 was prepared as a film including a HC layer 301 formed of acrylic resin and having a thickness of 7 μm, a transparent base material 302 formed of TAC and having a thickness of 40 μm, and a transparent adhesive layer 303 (glue) formed of acrylic resin and having a thickness of 12 μm.

In the table of FIG. 4, the item "transparency" indicates the transparency of the transparent layer 300. The device of (1) lacks the transparent layer 300 and thus, the transparency is 100%. The devices of (2) to (5) exert substantially 100% transparency.

In the table of FIG. 4, the item "N/R" indicates the result of the visual evaluation of interference fringes generated by applying an external force to the liquid crystal display device 1 of each of (1) to (5). In (1) to (3), the occurrence of interference fringes was not fully prevented (results were NG). On the other hand, in (4) and (5), interference fringes were almost unrecognizable and an excellent preventive effect was obtained (results were OK).

The interference fringe state was graded from 1 (bad) to 5 (light) and grades below 4 were evaluated "NG" and grades 4 to 5 were evaluated "OK". FIG. 5 is a graph showing a relationship between the interference fringe grades and the thickness H of the transparent layer 300. The sampling points used for the graph include the thickness H of each of (1) to (5) shown in FIG. 4. The curve in the graph is an approximate curve going along grade evaluated at each of the sampling points. The interference fringe grade evaluated when the thickness H=0 μm was set to 1. The interference fringe grade gradually improved when the thickness H approached 10 μm showing a steeple rise, exceeded grade 4 when the thickness H approached 30 μm, and then almost reached grade 5.

The graph shows that interference fringes are suppressed better as the thickness H increases. Furthermore, around a thickness of 30 μm, the interference fringe grade exceeds 4 which is a given criterion for the evaluation. The above proves that the present embodiment with the transparent layer 300 can achieve at least reduction or prevention of the occurrence of interference fringes, and can achieve a better result in suppression of interference fringes if the thickness H of the transparent layer 300 is approximately 30 μm or more.

If the thickness H is near 50 μm, the interference fringe grade reaches 5 which is the best condition in this evaluation. This proves that the present embodiment can achieve an excellent result in suppression of interference fringes if the thickness H of the transparent layer 300 is approximately 50 μm or more.

[Comparison with Other Methods]

Now, the structure of the present embodiment is compared with the other methods used for reduction or prevention of interference fringes with reference to FIG. 6.

As the other methods, the following (I) to (IV) were adopted.

(I) In this method, the liquid crystal display device 1 was prepared without a transparent layer 300 but with a diffusion material added to the transparent adhesive layer 312 of the reflective polarizing layer 310. The transparent adhesive layer 312 with the diffusion material added thereto diffuses the light and shade of interference fringes, and the visibility of the interference fringes decreases.

(II) In this method, the liquid crystal display device 1 was prepared without a transparent layer 300 but with the polarizing plate 33 whose surface has been subjected to a diffusion treatment (for example, an antiglare treatment) to be a diffusion layer. The diffusion layer diffuses the light and shade of interference fringes, and the visibility of the interference fringes decreases.

(III) In this method, the liquid crystal display device 1 was prepared without a transparent layer 300 but with the reflective polarizing layer 310 whose surface at the second prism sheet 23 side (that is, incident surface 310*a*) has been subjected to a diffusion treatment (for example, an antiglare treatment) to be a diffusion layer. The diffusion layer diffuses the light passing through and reflected upon the reflective layer 311, and the occurrence of interference fringe itself can be prevented.

(IV) In this method, the liquid crystal display device 1 was prepared without a transparent layer 300 but with a diffusion sheet inserted between the reflective polarizing layer 310 and the second prism sheet 23. The diffusion sheet diffuses the light from the second prism sheet 23 and incident on the reflective polarizing layer 310 and the light reflected by the reflective polarizing layer 310 and incident on the second prism sheet 23, and the occurrence of interference fringe itself can be prevented.

Liquid crystal display devices of the methods (I) to (IV) and the liquid crystal display device 1 of the present embodiment with the transparent layer 300 on the incident surface 310*a* of the reflective polarizing layer 310 were prepared for evaluating the avoidance of occurrence of interference fringes and the change ratio of display brightness. The liquid crystal display devices were all prepared the same except the parts explained in (I) to (IV) above. The brightness of a liquid crystal display device which was prepared not based on any method of the present embodiment or of above (I) to (IV), that is, the brightness of a liquid crystal display device shown in FIG. 1 excluding the transparent layer 300 was used as the criterion for the evaluation of the change ratio of the brightness.

The evaluation showed that the liquid crystal display devices of the methods (I) and (II) slightly reduced the interference fringes. However, the change ratio of the brightness was −6% or less in the liquid crystal display device of the method (I) and the change ratio of the brightness was −5% or less in the liquid crystal display device of the method (II).

Furthermore, the evaluation showed that the liquid crystal display devices of the methods (III) and (IV) almost completely avoided the occurrence of the interference fringes. However, the change ratio of the brightness was −5% or less in the liquid crystal display device of the method (III) and the change ratio of the brightness was −10% or less in the liquid crystal display device of the method (IV).

The liquid crystal display device 1 of the method of the present embodiment can perform substantially complete avoidance of interference fringes particularly when the thickness H is 30 µm or more. Or, the present embodiment can reduce the visibility of interference fringes remarkably. In the present embodiment, the transparent layer 300 is interposed between the prism surface 23*a* and the reflective polarizing layer 310 and is adhered closely to the reflective layer 311. Such a structure always keeps the gap G greater than the thickness H of the transparent layer 300 even if the gap G is reduced by warpage or the like of the prism surface 23*a*. As shown in FIG. 8, the interference fringes appearing on the display area become larger as the gap G decreases; however, the gap G never becomes less than the thickness H of the transparent layer 300 in the present embodiment and thus, the gap G never becomes excessively narrow in the present embodiment. Furthermore, as can be understood from the above examples, the interference fringes become recognizable when the gap G is less than 30 µm, and thus, the thickness H of the transparent layer 300 is 30 µm or more to maintain a gap G of at least 30 µm.

Consequently, the interference fringes do not occur at all, or occur very limitedly. Thus, the visibility of interference fringes can be reduced remarkably.

Furthermore, the change ratio of the brightness is substantially 0% (no change in the brightness) in the present embodiment. That is, the liquid crystal display device 1 of the present embodiment can reduce or prevent the occurrence of interference fringes without affecting the brightness.

The structure of the above embodiment may be changed into various forms.

For example, in the present embodiment, the transmissive type liquid crystal display device 1 is disclosed as an example of the display device including the reflective polarizing plate 31. However, the reflective polarizing plate 31 can be used as an optical element in any other display devices such as a reflective type liquid crystal display device, a transreflective type liquid crystal display device, or a non-liquid crystal display device.

The structure of the reflective polarizing layer 310 is not limited to the disclosure of the above embodiment. The reflective polarizing layer 310 may be structured as a circular polarizing separation type layer or a wire grid type layer.

The structure of the transparent layer 300 is not limited to the disclosure of the above embodiment. For example, the transparent layer 300 may not include the HC layer 301. The advantage of the reduction or prevention of the occurrence of interference fringes mainly depends on the thickness H of the transparent layer 300. Therefore, the transparent layer 300 without the HC layer 301 can reduce or prevent the occurrence of interference fringes.

The optical elements of the liquid crystal display device 1 are not limited to those shown in FIG. 1. The liquid crystal display device 1 may include additional optical elements in addition to the optical elements shown in FIG. 1 or may exclude part of the optical elements therein.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A display device comprising:
a light source;
a light guide including a first incident surface at which light from the light source enters and a first exit surface from which the light incident on the first incident surface exits;
a prism sheet over the light guide;
a transparent layer over the prism sheet;

a reflective polarizing layer over the transparent layer, the reflective polarizing layer including a second incident surface at which the light from the first exit surface enters and a second exit surface opposed to the second incident surface, the reflective polarizing layer configured to transmit a first polarized component of the light incident on the second incident surface to the second exit surface and to reflect a second polarized component of the light incident on the second incident surface to the transparent layer, the second polarized component being orthogonal to the first polarized component; and a display panel over the reflective polarizing layer, the display panel configured to selectively transmit the light exiting from the reflective polarizing layer, wherein:

the transparent layer includes a first surface adhered to the second incident surface of the reflective polarizing layer and a second surface opposed to the first surface, the transparent layer being configured to transmit the first and second polarized components incident on the second surface to the first surface and to transmit the second polarized component incident on the first surface by being reflected by the reflective polarizing layer to the second surface, the transparent layer includes a transparent base and a first transparent adhesive layer configured to attach the transparent base to the second incident surface, and the transparent base includes a film consisting essentially of a single transparent material and transmits the light with substantially no optical phase difference.

2. The display device of claim 1, wherein a light transparency of the transparent layer is 95% or more.

3. The display device of claim 1, wherein a thickness of the transparent layer is 30 μm or more.

4. The display device of claim 1, wherein a thickness of the transparent layer is 50 μm or more.

5. The display device of claim 1, wherein the reflective polarizing layer includes a reflective layer configured to reflect the second polarized component of the light incident on the second incident surface, a polarizing layer configured to transmit the first polarized component of the light passing through the reflective layer and to absorb other polarized components, and a second transparent adhesive layer configured to attach the reflective layer and the polarizing layer to each other.

6. An optical sheet disposed between a display panel and a prism sheet, the optical sheet comprising:

a transparent layer; and a reflective polarizing layer over the transparent layer, the reflective polarizing layer including an incident surface at which the light from the transparent layer enters and an exit surface opposed to the incident surface, the reflective polarizing layer configured to transmit a first polarized component of the light incident on the incident surface to the exit surface and to reflect a second polarized component of the light incident on the incident surface to the transparent layer, the second polarized component being orthogonal to the first polarized component, wherein the transparent layer includes a first surface adhered to the incident surface of the reflective polarizing layer and a second surface opposed to the first surface, the transparent layer being configured to transmit the first and second polarized components incident on the second surface to the first surface and to transmit the second polarized component incident on the first surface by being reflected by the reflective polarizing layer to the second surface, the transparent layer includes a transparent base and a first transparent adhesive layer configured to attach the transparent base to the incident surface, the transparent base includes a film consisting essentially of a single transparent material and transmits the light with substantially no optical phase difference, and the optical sheet is disposed between a display panel and a prism sheet, such that the transparent layer is over the prism sheet.

7. The optical sheet of claim 6, wherein a light transparency of the transparent layer is 95% or more.

8. The optical sheet of claim 6, wherein a thickness of the transparent layer is 30 μm or more.

9. The optical sheet of claim 6, wherein a thickness of the transparent layer is 50 μm or more.

10. The optical sheet of claim 6, wherein the reflective polarizing layer includes a reflective layer configured to reflect the second polarized component of the light incident on the incident surface, a polarizing layer configured to transmit the first polarized component of the light passing through the reflective layer and to absorb other polarized components, and a second transparent adhesive layer configured to attach the reflective layer and the polarizing layer to each other.

* * * * *

UNITED STATES PATENT AND TRADEMARK OFFICE
CERTIFICATE OF CORRECTION

PATENT NO. : 9,733,415 B2
APPLICATION NO. : 14/509425
DATED : August 15, 2017
INVENTOR(S) : Michikazu Noguchi Page 1 of 1

It is certified that error appears in the above-identified patent and that said Letters Patent is hereby corrected as shown below:

On the Title Page

Page 2 at Other Publications:
Please replace "for corresponding Japanese Application No. 10-2016-0092612" with
-- for corresponding Korean Application No. 10-2016-0092612 --

Signed and Sealed this
Tenth Day of October, 2017

Joseph Matal
*Performing the Functions and Duties of the*
*Under Secretary of Commerce for Intellectual Property and*
*Director of the United States Patent and Trademark Office*